United States Patent [19]

Tomita et al.

[11] Patent Number: 5,281,818
[45] Date of Patent: Jan. 25, 1994

[54] PYRO-ELECTRIC TYPE INFRARED DETECTOR

[75] Inventors: Yoshihiro Tomita, Osaka; Ryoichi Takayama, Suita; Motonobu Yoshikawa, Nishinomiya; Yoshiharu Yamamoto, Toyonaka, all of Japan

[73] Assignee: Matsushita Electric Industrial Co., Ltd., Osaka, Japan

[21] Appl. No.: 712,681

[22] Filed: Jun. 10, 1991

[30] Foreign Application Priority Data

Jun. 11, 1990 [JP] Japan ................... 2-151952
Jun. 11, 1990 [JP] Japan ................... 2-151957

[51] Int. Cl.$^5$ ............................... G01J 5/10
[52] U.S. Cl. ..................... 250/347; 250/349; 250/338.3
[58] Field of Search ............. 250/347, 349, 338.3, 250/343, 352, 353; 340/600

[56] References Cited

U.S. PATENT DOCUMENTS

| | | | |
|---|---|---|---|
| 4,158,504 | 6/1979 | de Ponteves et al. | 250/347 |
| 4,930,864 | 6/1990 | Kuster et al. | 250/342 |
| 5,004,922 | 4/1991 | Edwards | 250/347 |
| 5,159,200 | 10/1992 | Dunbar et al. | 250/342 |

FOREIGN PATENT DOCUMENTS

| | | |
|---|---|---|
| 0152181 | 8/1985 | European Pat. Off. |
| 3615946 | 11/1987 | Fed. Rep. of Germany |
| 53-41279 | 4/1978 | Japan |
| 58-180918 | 10/1983 | Japan |

OTHER PUBLICATIONS

"Pyroelectric Detector Arrays", S. G. Porter, Plessey Research (Caswell) Ltd., UK, 1985, pp. 30-33.
"Pyroelectric Linear Array Infrared Sensors Made of C-Axis-Oriented La-Modified PbTiO$_3$ Thin Films", Ryoichi Takayama et al., Matsushita Electric Industrial Co., Ltd., Publication Feb. 8, 1988, J. Appl. Phys 63(12), Jun. 15, 1988, pp. 5868-5872.
"A New Pyroelectric Infrared Focal Plane Array", Technical Digest of the 8th Sensor Symposium, 1989, pp. 59-62, Yoshihiro Tomita et al.
"Pyroelectric Infrared Array Sensors Made of C-Axis-Oriented La-Modified PbTiO$_3$ Thin Films", Ryoichi Takayama et al., Sensors & Actuators, A21-A23 (1990) 508-512.

*Primary Examiner*—Carolyn E. Fields
*Assistant Examiner*—Drew A. Dunn
*Attorney, Agent, or Firm*—Wenderoth, Lind & Ponack

[57] ABSTRACT

An apparatus for detecting position or temperature distribution of an object has a lens which is rotated around a pyroelectric type infrared sensor to collect incident infrared ray on the sensor while scanning the incident infrared ray in a rotational direction. The optical scanning is operated also in the longitudinal direction by providing with a plurality of lenses having different view in the longitudinal direction, the lenses being rotated sequentialy around the sensor. Further, detection of temperature of an object is conducted without using optical chopper by alternately observing the object and a standard temperature material which is arranged in a part of view, or by providing a stationary slit unit on a curved surface formed around a center axis which is the same as the rotation axis of the lens and a movable slit unit having the same pitch and arranged adjacent to the stationary slit unit and rotating together with the lens to intermitting the incident infrared ray.

1 Claim, 5 Drawing Sheets

PYRO-ELECTRIC TYPE INFRARED DETECTOR

BACKGROUND OF THE INVENTION

1. Field of the Invention

The invention relates to an apparatus for detecting the position or temperature of an object by using a pyroelectric type infrared sensor.

2. Description of the Prior Art

As a pyroelectric-type infrared detecting apparatus, there has been hitherto known a device in which an object is mechanically scanned with a scanning reflecting mirror using a point sensor or a linear array sensor or a device in which the whole object area is covered by a two-dimensional array sensor. However, these devices have drawbacks in that the former devices which use a scanning reflecting mirror are large in size and are high in cost because of their complicated structure and the latter devices, which use a two-dimensional array sensor to obtain a wide range of view, require a wide-angle infrared lens which is difficult to fabricate and is therefore expensive. Particularly, a device, wherein the temperature of an object is measured by using a pyro-electric sensor, is large in size since the measurement must be carried out by interrupting incident infrared rays using of an optical chopper to determine the difference between the value when the chopper is opened and the value when the chopper is closed.

Recently, a pyro-electric type infrared detecting device of the scanning type has been studied as an industrial measuring device such as a line scanner or a sensor for detecting indoor status for crime prevention, diaster prevention or air conditioning and the like. An example of such a device is disclosed in Japanese unexamined patent publication No. 53-41279/1978.

Hereinafter, an example of a conventional pyro-electric type infrared detecting device will be explained with reference to the drawings of this application.

FIG. 7 shows a conventional scanning type non-contact temperature measuring apparatus. In FIG. 7, element 21 is a motor rotating at a constant speed; element 22 is a rotational axis of the motor; element 23 is a rotating disk; element 24 is a pin; element 25 is a scanning reflection mirror; element 26 is a supporting shaft; element 27 is a connecting arm; element 28 is an object to be measured; element is a reflecting mirror; element 30 is a reflecting mirror; element 31 is a rotating sector for interrupting infrared rays; element 32 is a lens for collecting light, and element 33 is an infrared ray detector.

With referrence to the scanning type non-contact temperature measuring device constituted as above, the action of the device will be explained below.

The rotational movement of the motor 21 is transmitted to the scanning reflecting mirror 25 through the connecting arm 27 to cause reciprocal movement of the scanning reflecting mirror 25. The infrared ray emitted from each point of measuring object scanned by reciprocal movement of the scanning reflecting mirror 25 is reflected by the reflecting mirrors 29 and 30, and collected by the collecting lens 33 and sent to the infrared detector 32. The rotation sector 31 provided in front of the infrared ray detector 33 is rotated by the motor 21, and the temperature can be measured since a groove is formed to transmit the infrared ray at one position of the scanning reflecting mirror.

However, the above mentioned structure, wherein the scanning reflecting mirror 25 is arranged in front of collecting lens 32, involves drawbacks in that the device is difficult to be installed or to be made compact in size due to its complicated driving system construction, or in that while the angle of view of the collecting lens can be made wide in the direction of rotation, the angle of view in the direction of the rotation axis is significantly limited for the lens.

SUMMARY OF THE INVENTION

It is an object of the invention to solve the above mentioned drawbacks and to provide a pyro-electric type infrared detecting apparatus having a simple structure, a small size and a wide range of view.

According to the invention, to achieve the above object, an infrared ray from an object is scanned by allowing the lens for collecting the incident infrared ray on a sensor to rotate around the sensor. Thus, the invention provides an infrared ray detecting apparatus of diminished movable portions, compact size and reduced cost while having a wide range of view in the direction of rotation of the lens and a range of view in the direction of the rotation axis of the lens equivalent to that of the lens.

Further, according to the present invention, the necessary number of pixels of the sensor can be reduced by providing a plurality of lenses and dividing the area of view in the direction of the rotation axis with the passage of time, thereby giving a range of view larger than the view of each lens.

Furthermore, it is possible to detect the temperature of an object without using an optical chopper, by scanning the lens to observe and compare measurement results of an object and a body of a standard temperature provided at a part of the view of the lens in the direction of rotation thereof.

Furthermore, the measurement of temperature of an object can be conducted over a whole measurement area without leaving any area in which the measurement is impossible by satisfying the following condition:

$$w/2 \geq \left| \frac{\sin[2 \times \operatorname{Tan}^{-1}(a/2/f)]}{\sin(\theta)} \times f \right|$$

wherein, a (mm) is an effective radius of the lens in the direction of circumference, f(mm) is a forcal length of the lens, w(mm) is an effective width of an infrared sensor in the direction of scanning and $\theta$(deg) is an angle between an utmost end of the measuring area and the center of the measuring area.

Furthermore, the measurement of temperature of an object can be conducted without an optical chopper by interrupting infrared rays using the combination of a movable slit unit rotating together with the lens and a stationary slit unit arranged adjacent to the movable slit unit.

DESCRIPTION OF THE PREFERRED EMBODIMENTS

EXAMPLE 1

Figure 1A:
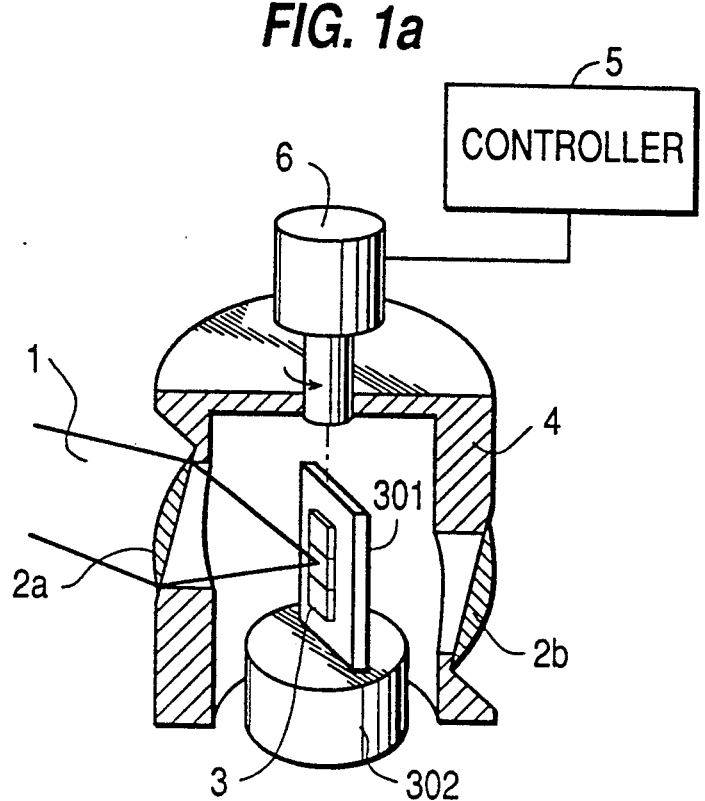
FIG. 1a is a perspective view showing a schematic construction of a pyro-electric type infrared detecting apparatus in accordance with Example 1 of the present invention.

Hereinafter, the first example in accordance with the present invention will be described with reference to the drawings. As shown in FIG. 1a, an incident infrared ray 1 is collected through lenses 2a and 2b on an array sensor 3 comprising a plurality of pyro-electric type infrared sensor elements arranged in one direction. The array sensor 3 is attached to a setting plate 301 fixed to a stationary base plate 302. The lenses 2a and 2b are arranged on outer surface of a cylinder 4 which is rotated about a rotation axis arranged parallel to the direction of arrangement of the sensor elements of array sensor 3. The lenses 2a and 2b are rotated by rotaing the cylinder 4 using a rotation driving means 6 such as a motor which is controlled by a control circuit 5 to scan the view of array sensor sequentially in the direction of rotation of cylinder 4. As shown in FIG. 2b, each of pixels of array sensor 3 consists of a face electrode 8 and back electrode 9 arranged on both surfaces of a pyroelectric material plate 7 and the electromotive force generated in each pixel is processed in an impedance converter 10 and then processed in a signal processor 11 to obtain information relating to the position or temperature of the object, which is a heat source.

Figure 1B:
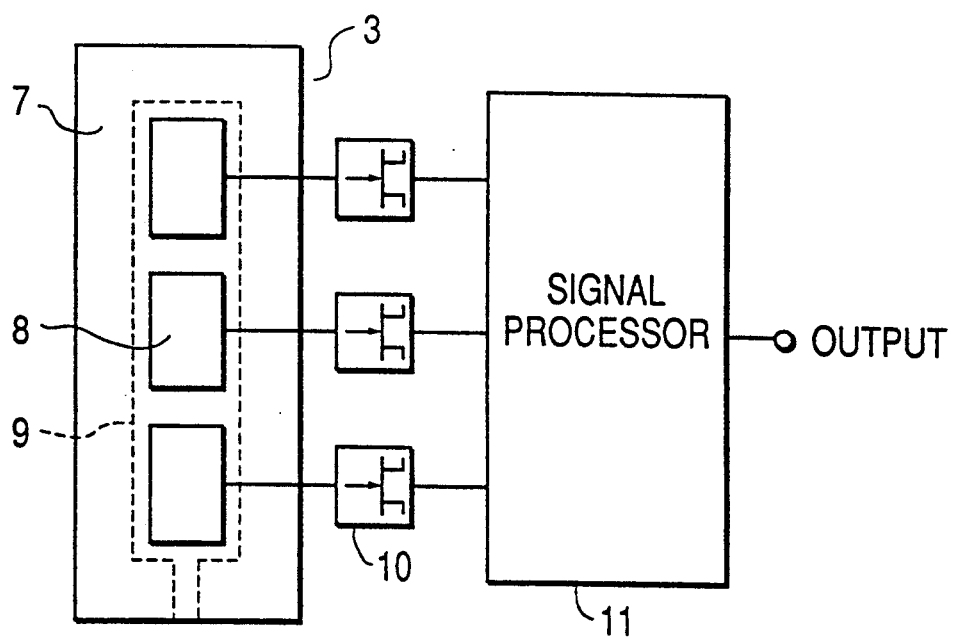
FIG. 1b is a schematic illustration of a constitution of an array sensor and signal processing system of Example 1.

In the pyro-electric type infrared detecting apparatus of the present invention, the optical system and mechanical system occupy only a volume of a cylinder 4 having a diameter equal to the focal length of the lenses 2a and 2b and a rotation driving means. Therefore, the invention gives an apparatus of simpler structure and smaller in size as compared with the conventional system which uses point sensor and scanning type reflecting mirror. Further, even if a lens having a narrow view is used as the lenses 2a and 2b, the present apparatus of the invention affords enough wide view in the direction of rotation. According to the present invention, the lenses 2a and 2b are arranged respectively on the front and back sides of the cylinder 4 and the angle of setting thereof in the direction of rotation axis is adjusted so that the lens 2a has an upward view and the lens 2b has downward view, whereby the view is divided into separated half fields while the cylinder 4 turns one round. By this arrangement, each of the lenses is allowed to have a half angle of view and the array sensor is permitted to have one half the usual number of pyroelectric elements. In the case of FIG. 1b, the apparatus has an array sensor of three pixels and two lenses 2a and 2b, and the view is divided into six areas. Thus, the apparatus will have a view angle of 60° if an area has a view of 10°. A more improved effect will be obtained, if the number of lenses is increased and the view angle is divided into more than two portions.

EXAMPLE 2

When a heat source has an area smaller than one pixel of the array sensor, the detection sensitivity will be decreased since the ratio of the area occupied by the image of the heat source to that of one pixel becomes small. On the other hand, this problem does not occur in the case of a heat source having a large area. Therefore, it becomes difficult to detect a small heat source. Hereinafter, Example 2 which overcomes this problem will be described referring to the drawings.

Figure 2A:
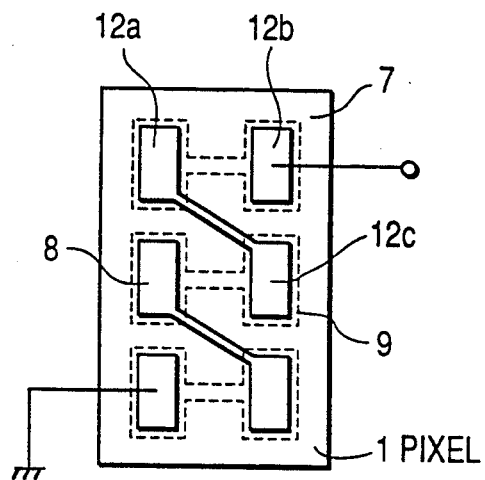
FIG. 2a is a schematic illustration showing a construction of an electrode of an array sensor in the pyroelectric type infrared detecting apparatus in accordance with Example 2 of the present invention.
Figure 2B:
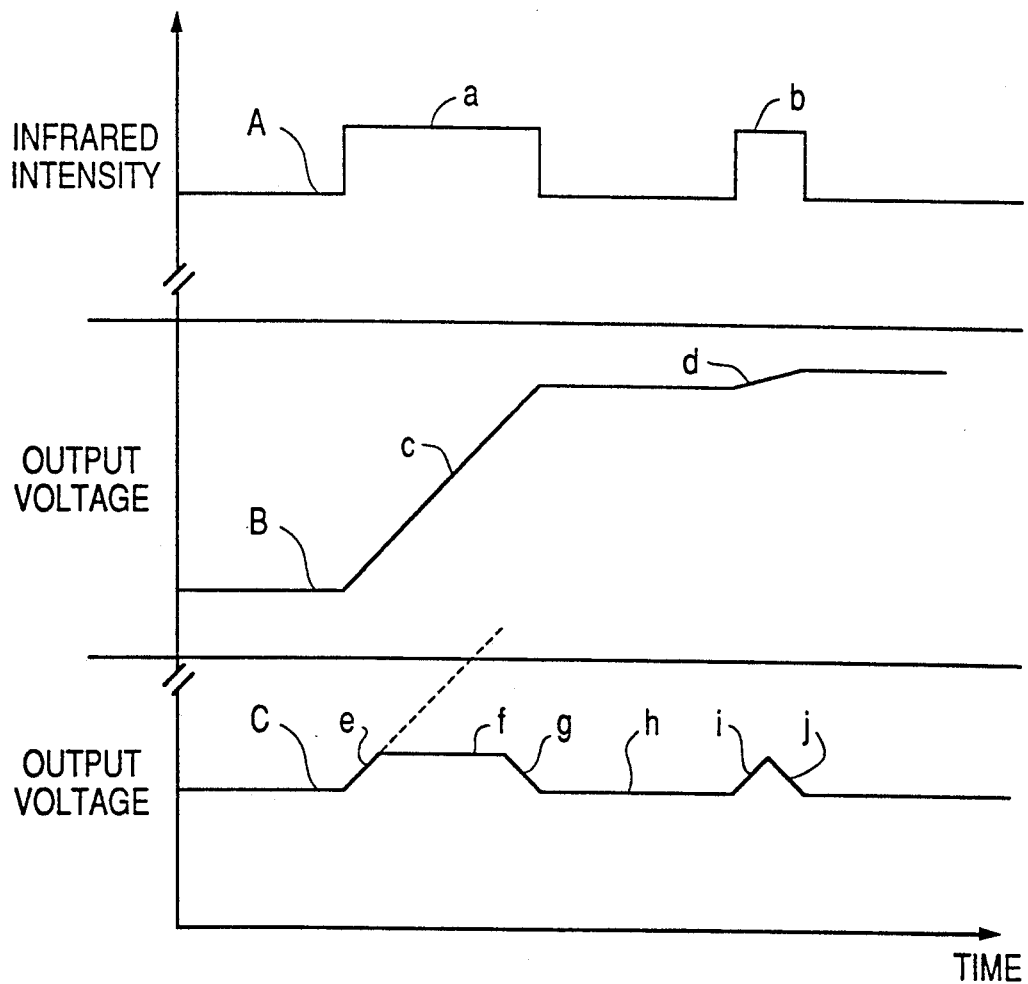
FIG. 2b is a waveform chart showing the intensity of the infrared ray and the output potential when the apparatus of Example 2 is operated.

FIG. 2a shows constitution of a pixel of array sensor 3 of the example wherein one pixel is composed of a plurality of pyroelectric elements 12a, 12b, 12c, etc., which are connected to electrodes 8 and 9 on both sides thereof. The constitution differs from that of FIG. 1b in which one pixel is composed of one pyroelectric element. The pyroelectric elements are arranged in two rows consisting of a 12a side a 12b side. When X is assigned to the direction connecting 12a and 12b and Y is assigned to the direction of arrangement of pyroelectric elements of each row, the pyroelectric elements arranged adjacent to each other in the direction of X are connected by a back electrode 9 such as 12a and 12b, and pyroelectric elements arranged adjacent to pyroelectric elements in the direction of direction of Y, the latter being connected by a back electrode, namely pyroelectric elements arranged in the diagonal direction, such as 12a and 12c, are connected with a front electrode 8 and all the pyroelectric elements are connected in series. As shown in the drawing, when a signal is output from a front electrode 8 of a pyroelectric element 12b, the polarity of all of the pyroelectric elements of the 12b side becomes positive and the polarity of all of the pyroelectric elements of the 12a side becomes negative. The other pixels of array sensor 3 are arranged in the Y direction and the image of infrared rays collected by the lens 2 is scanned in the X direction by rotation of the lens 2.

Referring to FIG. 2b, a waveform of output potential generated when the lens 2 of this apparatus is rotated for scanning will be explained below. A shows a waveform of infrared rays coming into a pixel by scanning of lens 2; a is an image of the object having a width larger than that of the pixel and b corresponds to an image of an object having a width similar to that of pyroelectric element 12a.

B is a waveform of an output signal when one pyroelectric element is composed of one pixel, wherein, the temperature of the pyroelectric element is raised when it receives infrared rays from the object to raise the output voltage, so that the position of the object is detected by the change of the voltage. In the case of an object having a dimension larger than the width of the pixel, a large change of voltage, such as c, is generated since the amount of received light is large and the time of receiving infrared rays is long, but only a minor change of voltage, such as d, is generated in the case of a small object since one pixel has a small light receiving area so that the amount of received light is small and the time of receiving light is short.

On the other hand, in the constitution of the example, as shown by c, the voltage is raised, as shown by e, when the pyroelectric element 12b receives light, and, in the progress of scanning by the lens 2, a reverse electromotive force is generated when the pyroelectric element 12a begins to receive light to reach the state of f by compensating for the electromotive force which continues to rise as indicated by the dotted line. In the course of scanning, when the element 12a alone receives light, the voltage is attenuated to the level before light receiving. In the case of a small object, the flat part as shown in the case of large object is diminished, and the voltage is attenuated immediately after it is raised as shown by i and j. Thus, the device is used advantageously for detecting a small heat source since the height of the pulse is not dependent on the size of the object to obtain information of the size of the heat source from the information of the pulse amplitude.

EXAMPLE 3

The conventional device becomes large in size because the information of the temperature of an object is determined from the amplitude of an alternating current signal generated by intermitting infrared ray with a chopper.

To overcome this problem, the third example of the present invention will be described below with reference to the drawings.

Figure 3:
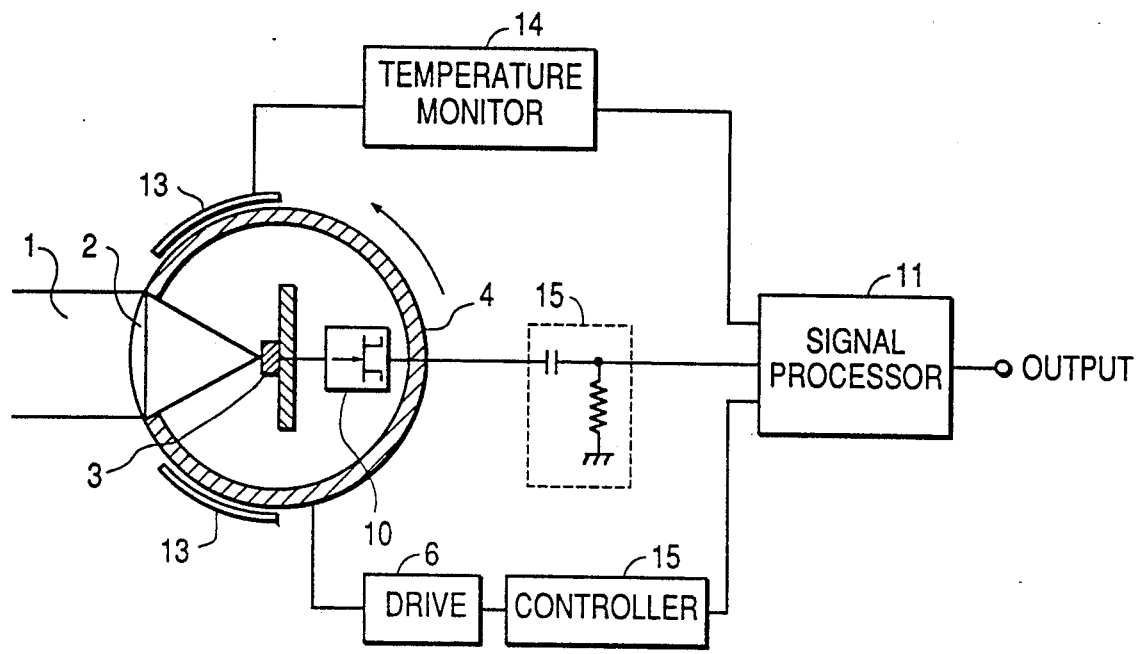
FIG. 3 is a top view showing a schematic construction of a pyro-electric infrared detecting apparatus in accordance with Example 3 of the present invention.

As shown in FIG. 3, the constitution of the apparatus of this example is different from that of FIG. 1 in that a screening plate 13, which limits the view of array sensor 3, is provided at a position nearby the lens 2 within an area of scanning view of the lens 2, and the temperature of the screening plate 13 is measured by a temperature monitoring part 14 to determine a standard temperature. Information of the temperature of an object can be obtained without a chopper by observing alternately the screening plate and the object while controlling the rotation of lens 2 via a controller 5.

The lens 2 may be rotated continuously. The signal issued from array sensor 3 is processed in an inpedance converter 10 and then subjected to differentiation by a differentiation circuit 15. In the frequency range lower than the cutoff frequency of the differentiation circuit 15, the differentiation becomes to be approximative because the signal is attenuated in the first-order relative to the frequency.

The output from a pyroelectric type infrared sensor is obtained as an integrated type corresponding to the incident infrared energy, in a period shorter than the temperature time constant, and, therefore, a relative distribution of infrared intensity is obtained by using a signal processor of the differentiation type. However, it is difficult to obtain the distribution of infrared intensity exactly for a long period of time since the generated output is attenuated after a lapse of time of the temperature time constant due to thermal diffusion from the pyroelectric element. It is possible to determine continuously the temperature distribution of an object based on a standard temperature material after measuring the temperature of the material by controlling the rotation of lens 2 with the controller 5 so that infrared ray issued from the standard temperature material is periodically applied within a time shorter than the temperature time constant.

Figure 4:
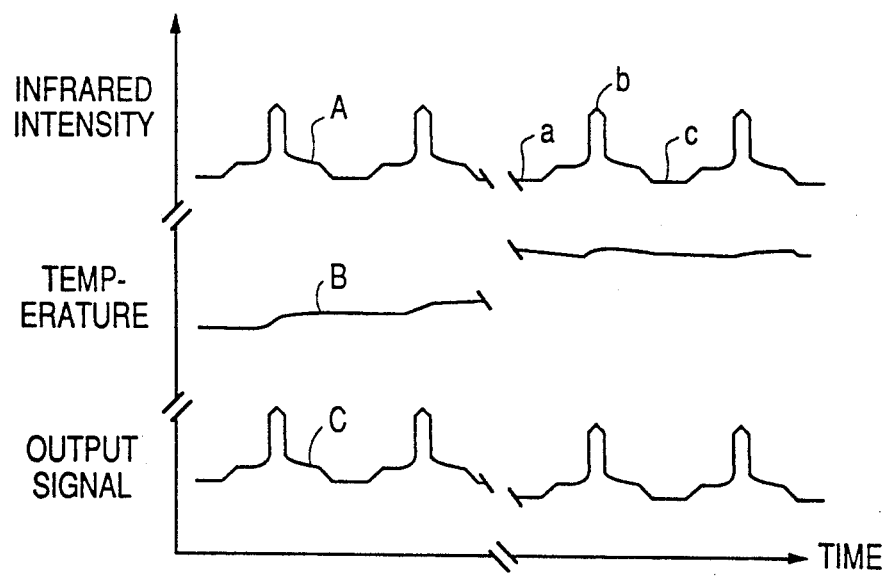
FIG. 4 is a waveform chart showing intensity of the infrared ray, and the temperature of array sensor and the output signal when the apparatus of Example 3 is operated.

FIG. 4 shows waveform charts of each part generated when the lens 2 is rotated. A shows intensity of incident infrared rays to the sensor 2 wherein a is a state when the infrared rays come in only from the screening plate 13, b is a state when infrared rays from an object comes in, and c is a state when again the infrared rays come only from the screening plate. Such a pattern of state change is repeated. B shows a waveform of the temperature of array sensor which has a wave form obtained by the integration of incident infrared ray. The electromotive force of the array sensor is changed proportionally to the temperature change of the array sensor. C shows an output signal obtained by differentiation relating to the signal with the differentiation circuit 15. The waveform of the output signal C takes the same form as that of distribution of incident infrared rays. However, the temperature distribution of an object can be obtained by making the output voltage of state a as a standard at every one cycle, since, as above mentioned, the output voltage of state a wherein only the infrared rays come only from the screening plate is not always constant at every cycle. With this system, it is possible to obtain the information of temperature distribution without changing the constitution of the apparatus and prepare a compact apparatus.

Further, it is also possible to obtain information of temperature of an object by providing a plurality of screening plates 13 at the way of view scanned by lens 2, and rotating the lens 2 in the fixed direction to observe alternately the screening plate and the object.

EXAMPLE 4

In Example 3, when the measurement is carried out by providing a plurality of screening plates 13 in the view scanned by lens 2 to divide the view into a plurality of areas which are measured separately in the course of the passage of time, there may be sometimes found an area where the measurement can not be conducted. Example 4 satisfies the conditions for overcoming this problem and is capable of conducting the measurement sequentially with lapse of time over the whole measuring area without leaving any dead area.

Figure 5:
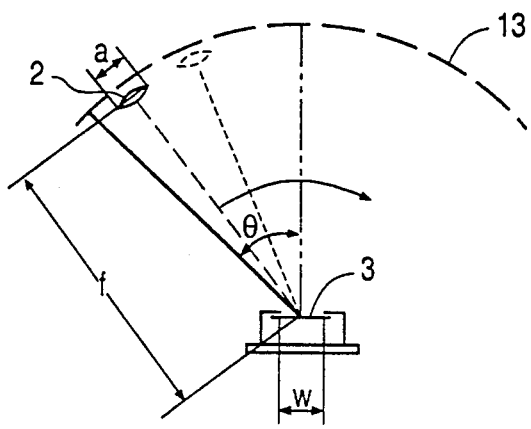
FIG. 5 is a top view illustrating the operation of Example 4.

Hereinafter, Example 4 will be explained with reference to the drawings. FIG. 5 shows a top illustration view wherein, a is an effective diameter of the lens in the direction of scanning, f is a focal length of the lens, w is an effective width of the pyroelectric sensor in the scanning direction and $\theta$ is an angle formed between an utmost end of the whole measuring area and the center of the whole measuring area. When each of the parameters satisfy the following formula, the measurement can be conducted sequentially in the course of the passage of time over the whole measuring area without leaving any dead area.

$$w/2 \geq \left| \frac{\sin[2 \times \mathrm{Tan}^{-1}(a/2/f)]}{\sin(\theta)} \times f \right|$$

Example of values practically obtained are shown in Table 1.

TABLE 1

| a | f | w | $\theta$ |
|---|---|---|---|
| 0.8 (mm) | 10 (mm) | 2.6 (mm) | 90 (deg) |

EXAMPLE 5

Figure 6:
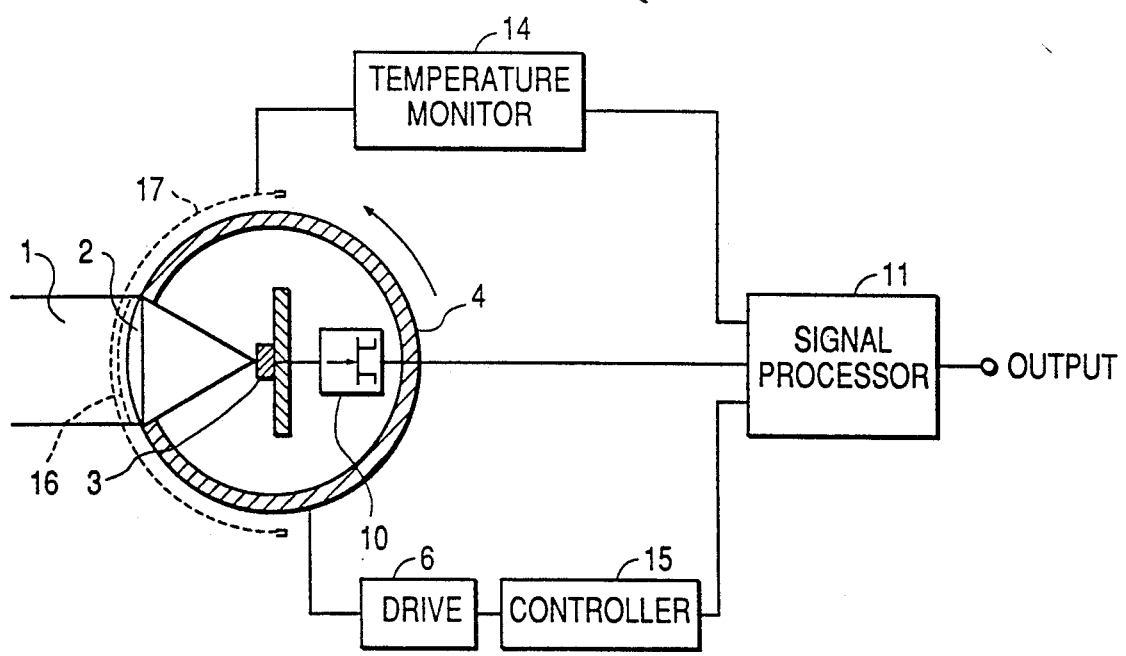
FIG. 6 is a top view showing a schematic construction of a pyro-electric infrared detecting apparatus of in accordance with Example 4 of the present invention.
Figure 7:
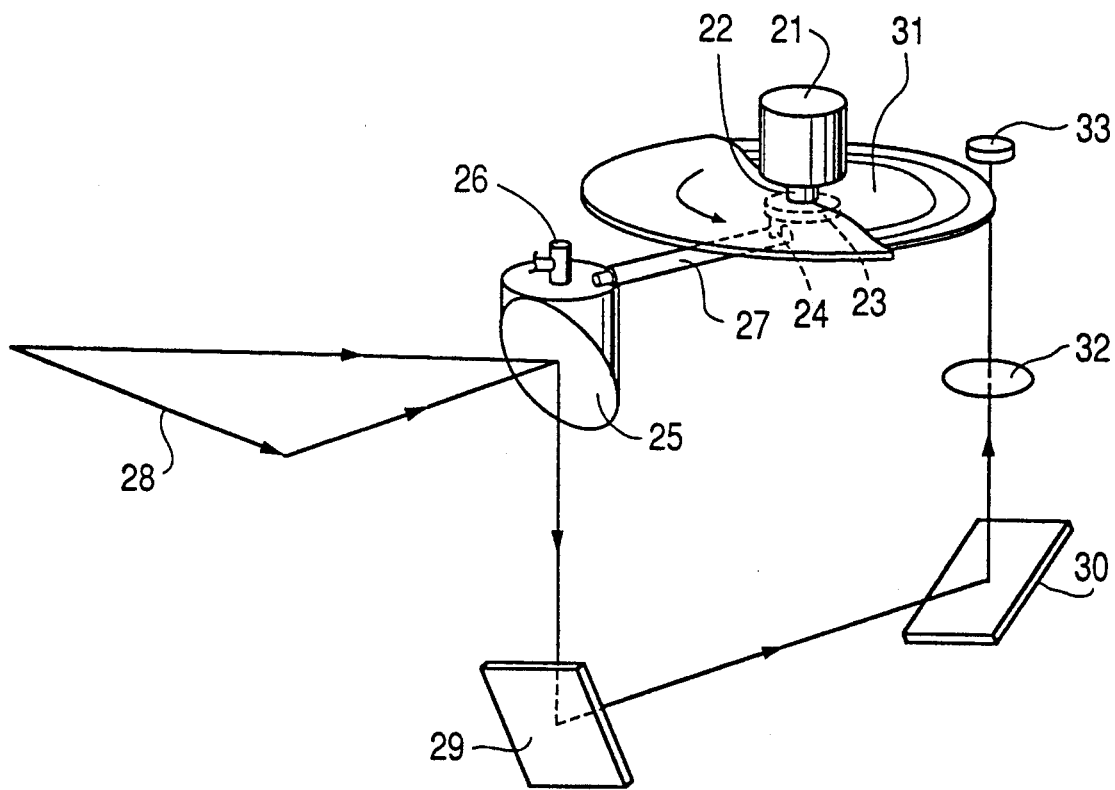
FIG. 7 is a perspective diagram showing a schematic construction of a conventional pyro-electric type infrared detecting apparatus.

Example 5 of the invention will be described below with reference to the drawings. This example, as shown in FIG. 6, differs from that of FIG. 3 in that a plurality of elongated slits 16 are provided at the outer periphery of cylinder 4 along the rotation axis thereof in the direction of the circumference at constant intervals, said slits being rotated with the cylinder, and a slit plate 17 provided with a plurality of slits at the same intervals as the slits 16 on a circle concetrically with the cylinder but slightly outside thereof. The intensity of the infrared rays 1 is determined by rotating the slits 16 together with the cylinder 4 and keeping the slit plate 17 stationary to interrupt the incident infrared rays, thereby measuring the amplitude of the output alternating signal. This method affords a significantly simpler structure which is capable of conducting scanning along the optical axis and interrupting the infrared rays with a single driving mechanism. The slits 16 and slit plate 17 may be provided within a cylinder having a diameter equal to the focal length of the lens or on the outer periphery thereof, and therefore, the constitution affords capability of interrupting infrared rays without losing the advantage that the apparatus is compact in size.

Although one row of array sensor is used in this example, the same effect can be obtained by using array sensors in more than one row. By using an array sensor of two rows, the so-called dead angle, namely, a direction to which the measurement can not be conducted with the array sensor of one row when the slits 16 are closed, can be measured by the supplemental use of another row.

Further, the slits 17, which are provided on the outer periphery of the cylinder 4, may be provided on the inner side thereof.

In Examples 2 and 3, the same effects will be obtained when the lens 2 and array sensor 3 are driven to rotate by fixing the lens and array sensor. Therefore, a more stable sensitivity can be obtained since the incident angle of the infrared rays with respect to the sensor becomes constant.

What is claimed is:

1. An infrared detecting apparatus comprising:
   an array sensor having an array of pyro-electric type infrared detectors arranged in one direction;
   a lens for collecting incident infrared rays on said array sensor;
   a driving means for rotating said lens around said array sensor about a rotation axis parallel to the direction of arrangement of said infrared detectors to scan said incident infrared rays in a direction of rotation about said rotation axis;
   a standard temperature material arranged adjacent to said lens in a part of view scanned by said lens, said standard temperature material being divided into a plurality of portions which are periodically arranged in the scanning direction; and
   a signal processor coupled to said sensor array for measuring a temperature of an object by comparing an output from said sensor array when receiving infrared rays from said object with an output from said sensor array when receiving infrared rays from said standard temperature material,
   wherein said array sensor and said lens are arranged to satisfy the following condition:

$$w/2 \geq \left| \frac{\sin(2 \times \operatorname{Tan}^{-1}(a/2/f))}{\sin(\theta)} \times f \right|$$

where, a is an effective diameter of said lens in the scanning direction, f is a focal length of said lens, w is an effective width of said array sensor in the scanning direction, and $\theta$ is an angle formed between an utmost end of a measuring area and a center of the measuring area.

* * * * *